United States Patent [19]

Saito et al.

[11] Patent Number: 4,819,121

[45] Date of Patent: Apr. 4, 1989

[54] SECURITY APPARATUS FOR POWER CONVERTER

[75] Inventors: Suzuo Saito; Shigetoshi Higaki, both of Tokyo, Japan

[73] Assignee: Kabushiki Kaisha Toshiba, Kawasaki, Japan

[21] Appl. No.: 124,387

[22] Filed: Nov. 19, 1987

Related U.S. Application Data

[63] Continuation of Ser. No. 906,494, Sep. 12, 1986, abandoned.

[30] Foreign Application Priority Data

Sep. 20, 1985 [JP] Japan .................. 60-207925

[51] Int. Cl.$^4$ .............................................. H02H 3/26
[52] U.S. Cl. ......................................... 361/85; 361/86; 361/87; 307/87; 363/56
[58] Field of Search .................... 361/85, 86, 91, 88, 361/87; 307/87, 127, 129; 363/55, 56, 57, 58

[56] References Cited

U.S. PATENT DOCUMENTS

| | | | |
|---|---|---|---|
| 4,330,816 | 5/1982 | Imazeki | 363/56 |
| 4,366,389 | 12/1982 | Hussey | 307/87 X |
| 4,443,709 | 4/1984 | Genuit et al. | 307/129 X |
| 4,528,457 | 7/1985 | Keefe et al. | 307/87 X |

OTHER PUBLICATIONS

"High–Frequency Isolated 4kW Photovoltaic Inverter for Utility Interface"; Proceedings of the 7th International PCI '83 Conference, Sep. 13-15, 1983, Geneva, Switzerland.

Primary Examiner—Gerald P. Tolin
Assistant Examiner—Derek S. Jennings
Attorney, Agent, or Firm—Oblon, Fisher, Spivak, McClelland & Maier

[57] ABSTRACT

A security apparatus adapted to a power converter, including a power converting circuit connected between a DC power source and an AC system; a phase detector circuit for detecting the voltage phase of the AC system to provide a phase detection signal; a reference signal generator circuit for generating a voltage reference in accordance with the phase detection signal; a control circuit for controlling an output voltage of the power converting circuit in accordance with the voltage reference. The security apparatus is characterized by a disturbance generator circuit for applying a disturbance to the phase detector circuit; and a detector circuit for detecting an abnormal state in which the phase or frequency of the output voltage of the power converting circuit deviates from a normal one.

7 Claims, 5 Drawing Sheets

E14

S11

S12

S13

S17

D215

S1

S17*

S1*

SECURITY APPARATUS FOR POWER CONVERTER

This application is a continuation of application Ser. No. 906,494, filed on Sept. 12, 1986, now abandoned.

BACKGROUND OF THE INVENTION

The present invention relates to an improvement of a security apparatus for a power converter provided between a DC source and an AC system, by which an abnormal condition (e.g., power suspension) of the AC system is reliably detected so that the operation of the power converter is stopped.

Recent development regarding new energy is given to solar cells or fuel cells, in order that electric power thereof can be utilized practically. Although the form of energy obtained from these cells is DC power, it is convenient if the energy is converted into AC power. Meanwhile, as one of most efficient system utilizing the above energy, it is proposed that the power converter is connected to an AC system, thereby feeding overflow power of the converter to the AC system. (The reason why such overflow power feeding should be done is that output power of the converter is not always fully consumed.)

FIG. 1 shows a schematic circuit configuration of a solar cell power generator system by which DC energy from solar cell 11 is converted into AC power and the converted AC power can be sent to AC system 14. Solar cell or DC source 11 is connected to power converter 12 containing power converting circuit 13. By circuit 13, DC power is converted into AC power. The output of circuit 13 is connected to AC system 14, and system 14 is connected to load 15.

Usually, the generated energy of solar cell 11 is fully consumed by load 15. However, if the amount of the generated energy exceeds the consumed energy, or the generated energy overflows, the overflowed energy is fed to AC system 14. On the other hand, if the energy from solar cell 11 for load 15 lacks, the lacked part of the energy is filled up by energy from AC system 14.

Power converter 12, serving to achieve the above energy supply, contains phase detector circuit 21 which outputs sine wave signal S1. Signal S1 is synchronized with the AC voltage phase of AC system 14. Signal S1 is supplied to reference signal generator circuit 22.

Circuit 22 can be constructed as follows. DC voltage reference setter 221 provides DC voltage reference signal Vrefdc. DC voltage signal Vdc obtained from DC voltage detector circuit 222 is compared with signal Vrefdc. The result (Vrefdc-Vdc) of this comparison is amplified through DC voltage control circuit 223. Circuit 223 outputs AC current amplitude reference Irefac. Sine wave signal S1 is multiplied by reference Irefac in multiplier circuit 224. Then, circuit 224 outputs AC current reference signal S2.

Signal S2 obtained from circuit 22 is compared with AC current signal Iac obtained from current transformer 23. The result (S2-Iac) of this comparison is applied to switching control circuit 24. According to the above comparison result, circuit 24 sends on/off signal S3 to switching elements in converting circuit 13.

According to the above power converter 12, the DC voltage, input to power converting circuit 13, can be made constant. In addition, according to the operation of the minor loop (13-23-24) for a current control, a sine wave current, flowing into AC system 14 or into load 15, can be synchronized with the AC voltage phase, thereby achieving the power factor 1.

Incidentally, although not shown, when a control loop for AC output power is contained in power converter 12, signal S2 can be used as a reference for providing the maximum AC output power. This type of control is generally called as a maximum power control.

When AC system 14 of FIG. 1 is subjected to power suspension, abnormal voltage detector circuit 25, connected to AC system 14, is rendered active. Then, an abnormal state of the voltage is detected, and the operation of power converter 12 is safely stopped. The reason why such an abnormal state of the voltage can be detected is that since the generated AC power from converter 12 usually differs from the consumed power of load 15, excessively generated power renders the voltage of system 14 high, while insufficient power renders the voltage thereof low. However, if the generated power from converter 12 matches the consumed power of load 15, or if load 15 is fully powered by converter 12 only, since AC system 14 is free of the supply of power to load 15, conventional abnormal voltage detector circuit 25 can no longer detect the abnormal state of the voltage (power suspension) of AC system 14. This is the disadvantage of the prior art apparatus shown in FIG. 1.

If abnormal voltage detector circuit 25 cannot detect power suspension of AC system 14, even when a circuit breaker (not shown) is provided at AC system 14 and the breaker is cut off according to the occurrence of the power suspension, the voltage applied to load 15 is kept at high. Consequently, it is very dangerous when a maintenance staff gets AC system 14 in working order. This is also the disadvantage of the prior art apparatus shown in FIG. 1.

SUMMARY OF THE INVENTION

It is accordingly an object of the present invention to provide a security apparatus for a power converter which can quickly and accurately detect an abnormal state (e.g., power suspension) of an AC power system even if the generated AC power from a power converter matches the consumed AC power of a load.

To achieve the above object, a security apparatus of the invention is adapted to a power converter which includes a power converting circuit connected between a DC power source and an AC system; a phase detector circuit for detecting the voltage (or current) phase of the AC system to provide a phase detection signal; a reference signal generator circuit for generating a voltage (or current) reference in accordance with the phase detection signal; a control circuit for controlling an output voltage (or output current) of the power converting circuit in accordance with the voltage (or current) reference. The security apparatus of the invention is characterized by a disturbance generator circuit for applying a disturbance to the phase detector circuit; and a detector circuit for detecting an abnormal state in which the phase or frequency of the output voltage (or output current) of the power converting circuit deviates from a normal one.

A security apparatus of the invention has an advantage that power suspension of the AC system can be surely detected regardless of the type of the control for a power converter, or regardless of the number of power converters connected to the AC system.

DETAILED DESCRIPTION OF THE PREFERRED EMBODIMENTS

Figure 1:
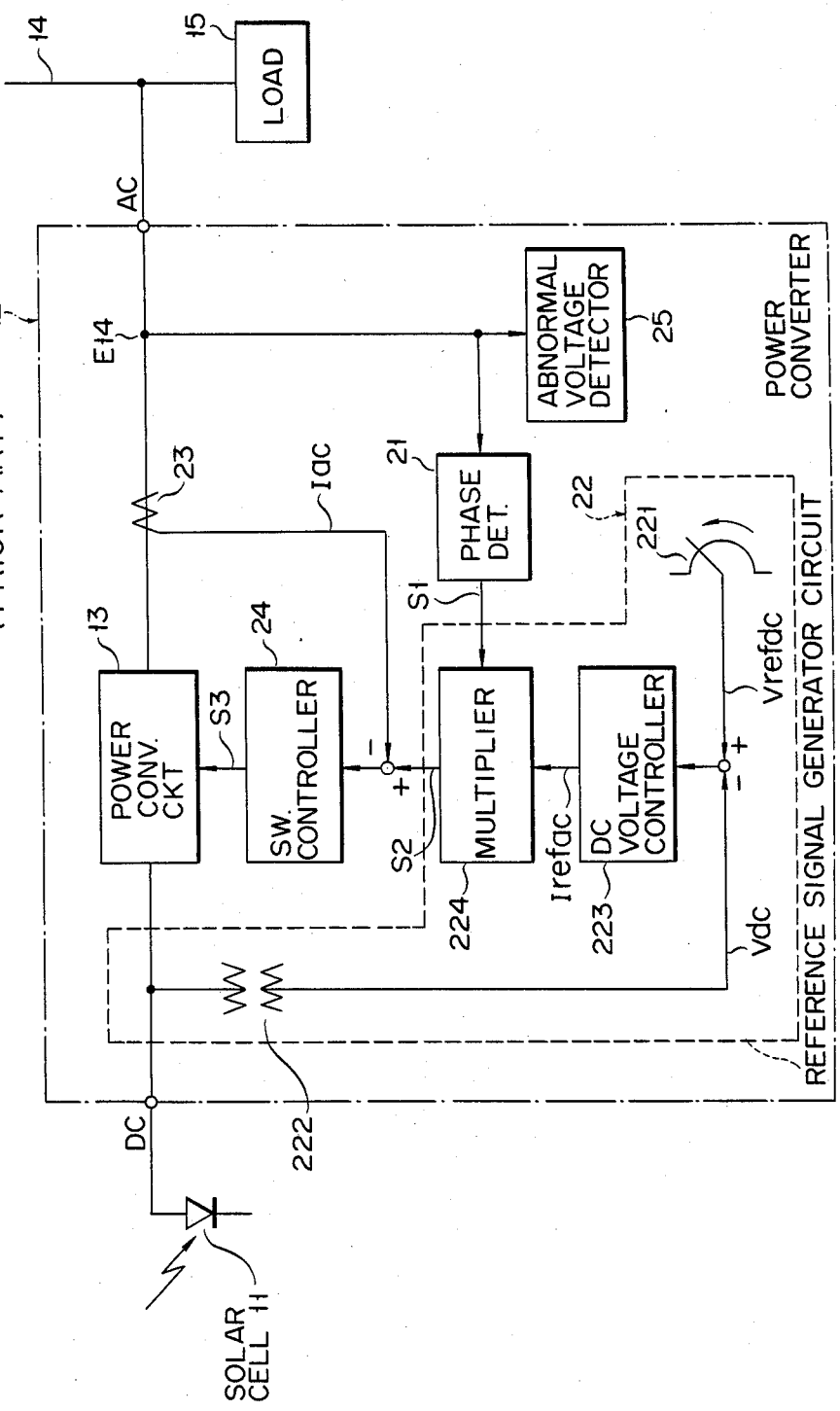
FIG. 1 shows a circuit configuration of a prior art power converter.

Hereinafter, preferred embodiments of the invention will be described in detail with reference to the accompanying drawings. In the following description, the same or similar elements are denoted by the same or similar reference numerals throughout the drawings, thereby avoiding redundant explanations.

Figure 2:
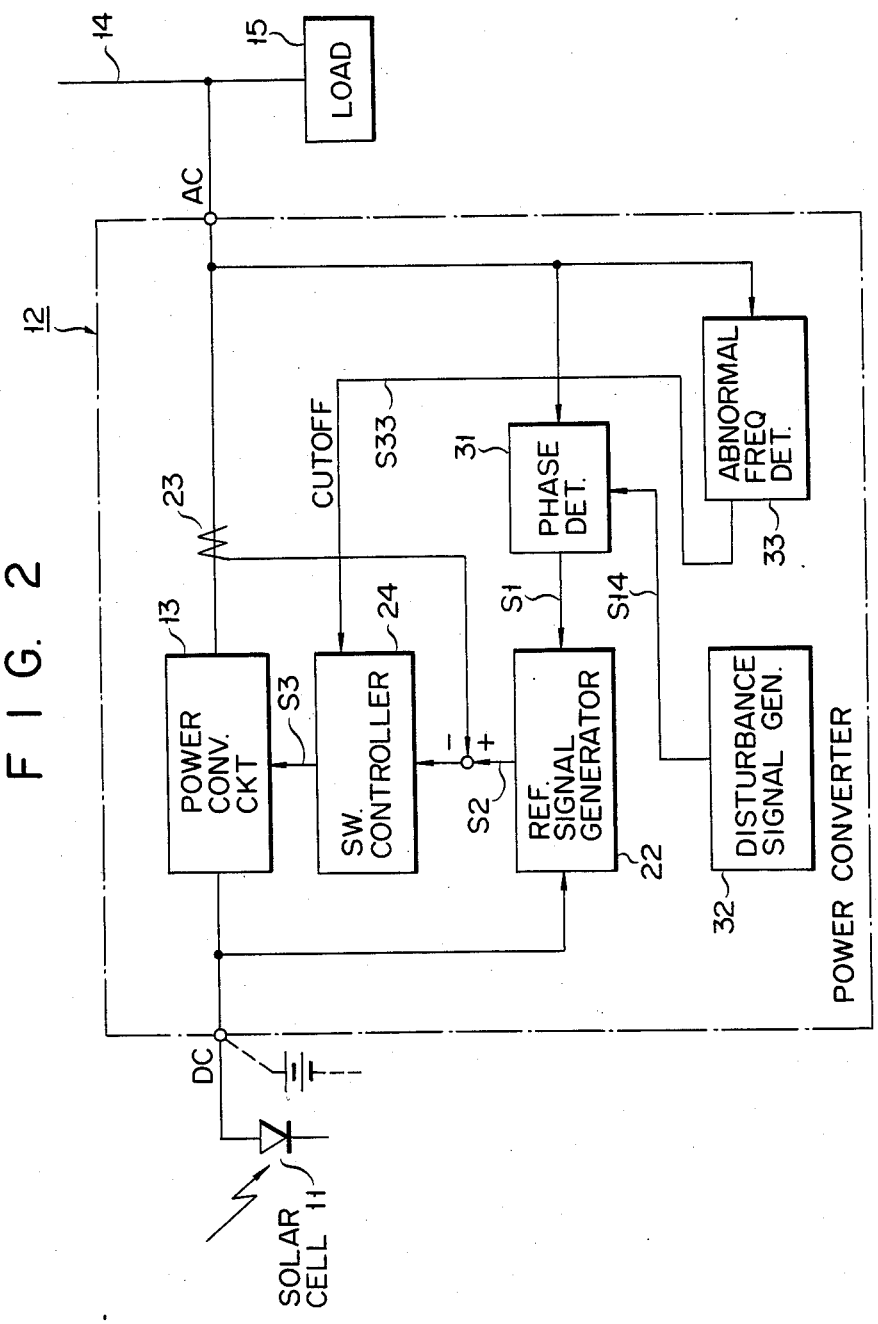
FIG. 2 shows an embodiment of a security apparatus for a power converter according to the present invention.

FIG. 2 shows an embodiment of a power converter according to the present invention. The configuration of FIG. 2 differs from that of FIG. 1 with respect to circuit elements 31 to 33. Thus, disturbance signal generator 32 supplies disturbance signal S14 to phase detector 31, and abnormal frequency detector 33 detects an abnormal frequency of AC system 14. Detector 31 supplies sine wave signal (phase detection signal) S1 to reference signal generator circuit 22. Detector 33 supplies cutoff signal S33 to switching control circuit 24 so that the operation of power converter 12 stops.

Figure 3:
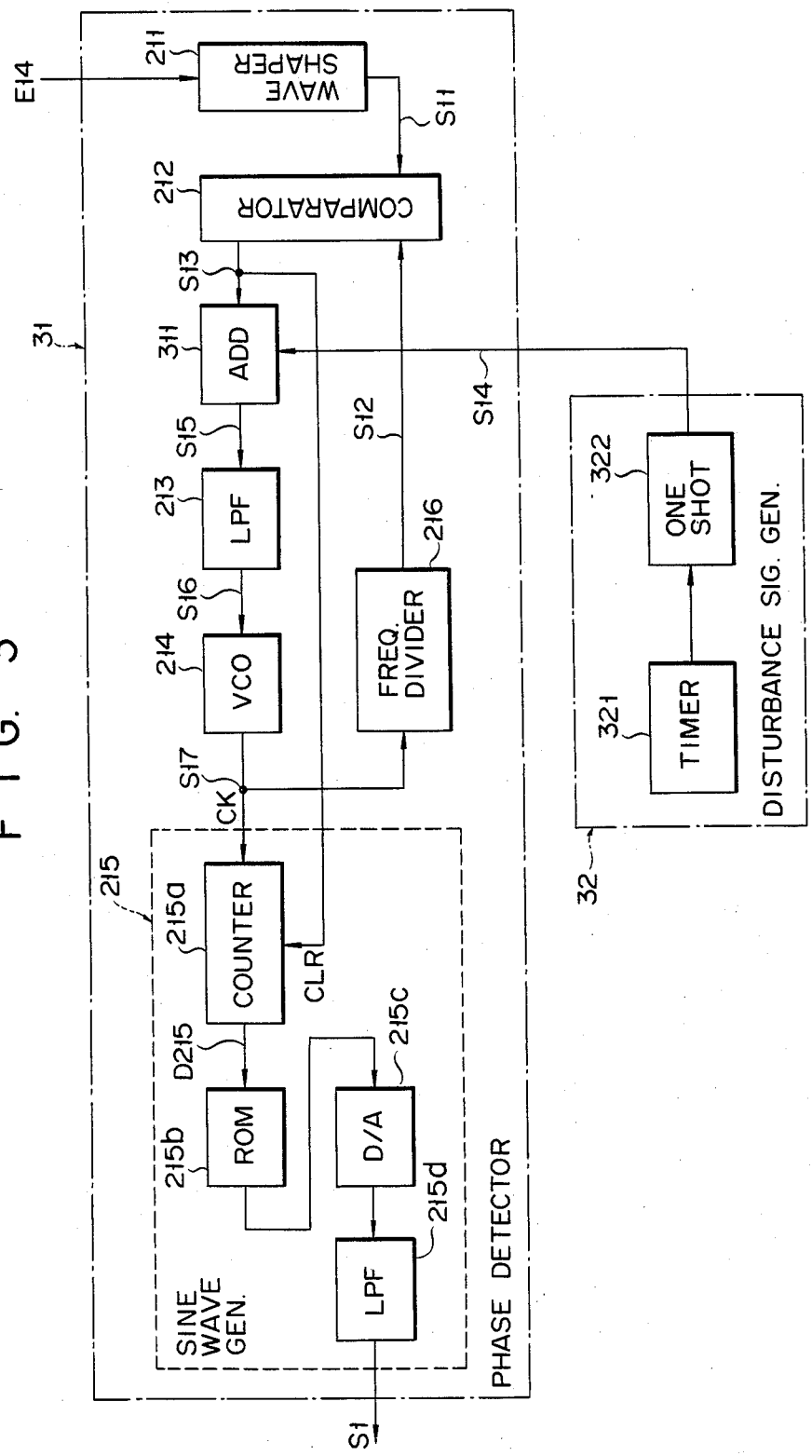
FIG. 3 shows details of phase detector circuit 31 and disturbance signal generator 32 shown in FIG. 2.
Figure 5A:
FIG. 5A to 5I show timing charts explaining the operation of the circuit of FIG. 3.
Figure 5B:
Figure 5C:
Figure 5D:
Figure 5E:
Figure 5F:
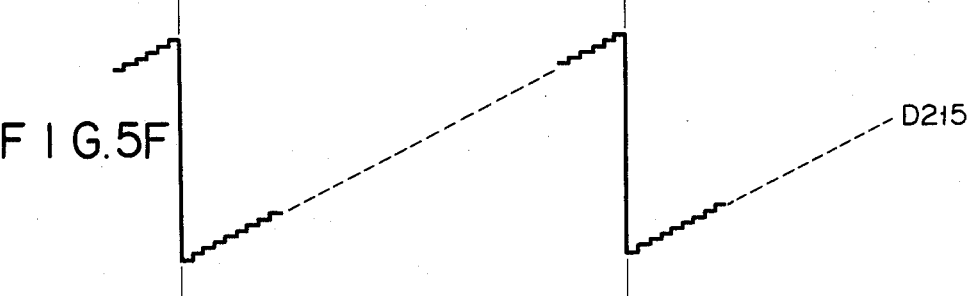
Figure 5G:
Figure 5H:
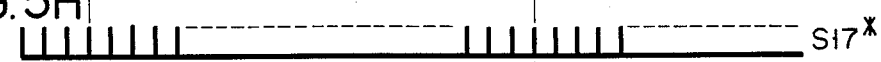
Figure 5I:
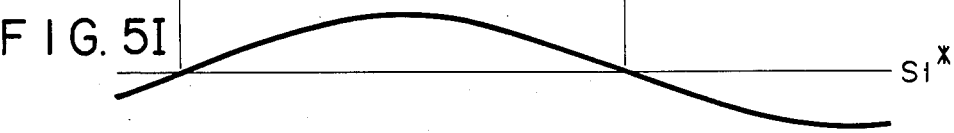

FIG. 3 shows details of phase detector 31 and disturbance signal generator 32, and FIG. 5A to 5I show timing charts explaining the operation of the circuit of FIG. 3. Phase detector 31 receives sinusoidal voltage signal E14 (FIG. 5A) from AC system 14. In detector 31, signal E14 is converted into rectangular wave signal S11 (FIG. 5B) through wave shaper circuit 211. Signal S11 is supplied to phase comparator 212. Comparator 212 compares the frequency and phase of signal S11 with those of given signal S12 (FIG. 5C). Signal S12 corresponds to Signal S11. As a result of the phase comparison, comparator 212 generates timing pulse S13 (FIG. 5D). Pulse S13 is always synchronized with signal S11. The width of pulse S13 is expanded when the phase of signal S12 lags behind signal S11. In this case, pulse S13 serves as a frequency-increasing signal. On the other hand, when the phase of signal S12 advances against signal S11, the width of signal S13 is narrowed. In this case, pulse S13 serves as a frequency-decreasing signal.

Timing pulse S13 is supplied to adder 311 which is also supplied with disturbance signal S14. Adder 311 mixes signal S14 to pulse S13 and provides signal S15. The potential of signal S15 is averaged through low-pass filter 213 and converted into frequency control signal S16. Signal S16 is applied to voltage-controlled oscillator 214. Oscillator 214 generates pulse train S17 (FIG. 5E) whose frequency depends on the potential of frequency control signal S16. Pulse train S17 is frequency-divided through frequency divider 216 and converted into said signal S12 whose frequency is set at the frequency of AC system 14.

The above circuit configuration, containing the closed loop of 211-212-311-213-214-216, is called a "Phase-Locked Loop (PLL)."

Pulse train S17 is supplied to counter 215a which is cleared by the trailing edge of timing pulse S13. Counter 215a counts the number of pulses of S17 within one period of S13. The result (D215 in FIG. 5F) of the count of counter 215a is supplied as address data to ROM 215b. ROM 215b provides digital sine wave data in accordance with the contents of the count result (D215). This digital sine wave data is converted into analog sine wave signal S1 (FIG. 5G), via Digital-to-Analog converter 215c and low-pass filter 215d. Circuit elements 215a–215d constitute sine wave generator circuit 215.

An important feature in the configuration of phase detector 31 resides in the use of adder 311 by which disturbance signal S14 is mixed with timing pulse S13.

Disturbance signal generator 32 can be formed of timer circuit (astable multivibrator) 321 and one-shot circuit (monostable multivibrator) 322. The frequency or phase of disturbance signal S14 differs from that of timing pulse S13. Thus, signal S14 has an effect that the synchronization between pulse S13 and the voltage of AC system 14 is broken.

Figure 4:
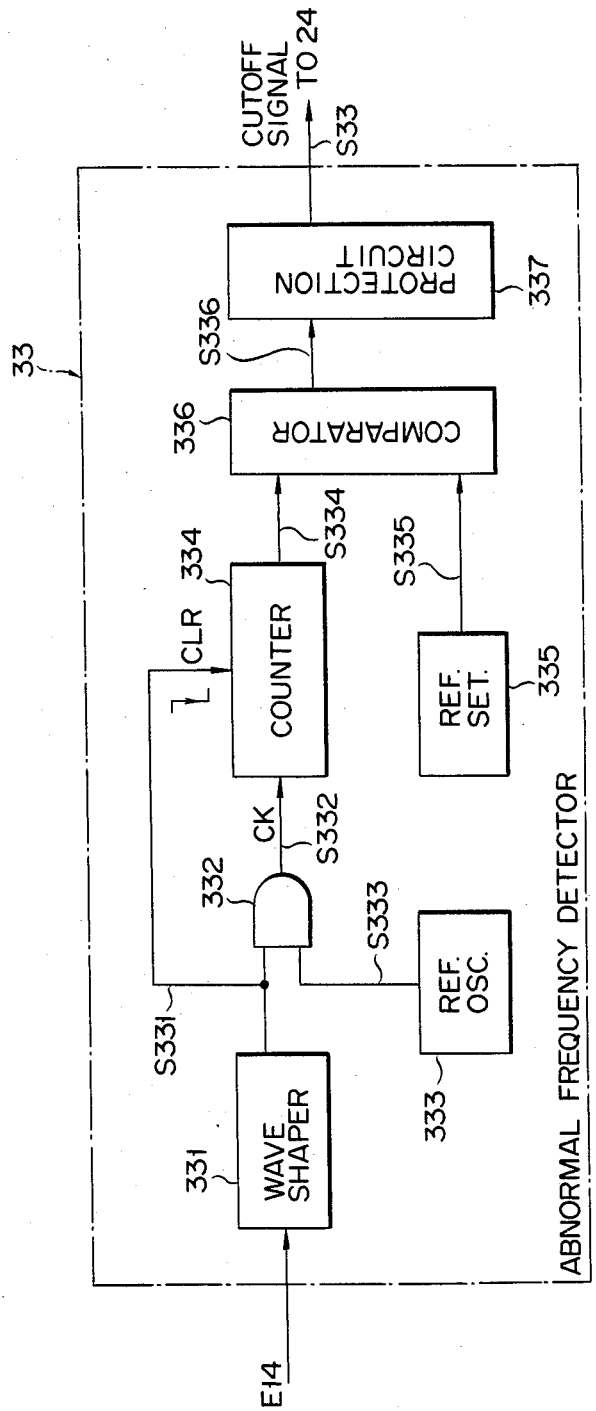
FIG. 4 shows details of abnormal frequency detector 33 shown in FIG. 2.

FIG. 4 shows details of abnormal frequency detector 33. In FIG. 4, voltage signal E14 of AC system 14 is converted into rectangular signal S331 through wave shaper 331. (The wave form of S331 is similar to S11 in FIG. 5B.) Signal S331 is supplied to the first input of AND gate 332. The second input of gate 332 receives reference pulse train S333 from reference pulse oscillator 333. AND gate 332 passes pulse train S333 only during a period in which the logic level of signal S331 is "1", and provide clock pulse S332. Thus, pulse S332 is generated for each half period of signal S331. Pulse S332 clocks counter 334 which is cleared by the trailing edge of signal S331. Count output S334 from counter 334 is supplied to digital comparator 336. Comparator 336 receives reference value S335 from reference setter 335. Comparator 336 compares count output S334 with reference value S335, and generates abnormal detection signal S336 when the difference between S334 and S335 exceeds a predetermined value.

Abnormal detection signal S336 is supplied to protection circuit 337 and cutoff signal S33 is generated therefrom, so that switching control circuit 24 stops the operation of power converter 12.

Now, explanation will be given to a case where AC system 14 of FIG. 2 is subjected to power suspension.

Assume that external disturbance (S14) is applied from disturbance signal generator 32 to phase detector 31 for each given time interval, so that the output voltage or output current of power converter 13 is caused to be varied from the rated value of the output voltage or output current.

Under the above assumption, when AC system 14 operates in the normal condition and if the magnitude (voltage) of the disturbance is at most a few % of the rated voltage value of AC system 14, since the capacity of AC system 14 is far larger than the variation due to the disturbance, the phase of the voltage of AC system 14 can be free of the influence of the disturbance. Accordingly, phase reference signal S11 of phase detector 31 is substantially fixed, and the influence of the external disturbance (S14) is nullified by the action of the closed loop (PLL) in phase detector 31. Thus, even if output signal S1 of phase detector 31 is temporarily asynchronized with AC system voltage signal E14 due to disturbance signal S14, it can then be synchronized with voltage signal E14, at once, by the action of the PLL in FIG. 3.

However, when AC system 14 is subjected to power suspension and the output power from power converting circuit 13 is wholly consumed by load 15, the large capacity of AC system 14 can no longer have any effect for the variation due to the disturbance. Then, the phase variation of the output voltage or output current due to the external disturbance (S14) directly modifies the phase of signal S11 which serves as the reference of phase detector 31. Namely, the reference (S11) is changed by the disturbance (S14), and the interval of pulse train S17 is elongated as shown by pulse train S17* in FIG. 5H, so that the frequency of phase detection signal S1 becomes low as shown by signal S1* in FIG. 5I. Thus, abnormal frequency detector 33, coupled to AC system 14, can detect the power suspension according to a fact that the frequency of AC system 14 deviates from a normal value.

Accordingly, regardless of the amount of power consumed by load 15, the embodiment of this invention shown in FIG. 2 can detect power suspension of AC system 14 based on the deviation of the AC system frequency and can surely stop the operation of power converter 12. This is the advantage of this invention.

The above advantage can be obtained even when a plurality of power converters (12) are connected to single AC system 14. In this case, when respective external disturbances of the power converters occur at random directions and if some of the external disturbances cancel the frequency deviation caused by other external disturbances, power suspension of the AC system cannot be detected. This problem, however, can be solved by matching all directions of the external disturbances in a single direction (e.g., a direction in which the AC system frequency increases with the increase of the disturbance).

While the invention has been described in connection with what is presently considered to be the most practical and preferred embodiment, it is understood that the invention is not to be limited to the disclosed embodiment but, on the contrary, is intended to cover various modifications and equivalent arrangements included within the scope of the appended claims which scope is to be accorded the broadest interpretation so as to encompass all such modifications and equivalent structures. For instance, the present invention should not be limited to the disclosed specific manner as to how an external disturbance is applied and/or how an external disturbance is obtained. Incidentally, a battery, fuel cell and/or solar cell may be used for DC source 11 in FIG. 2.

What is claimed is:

1. A security apparatus for a power converter, comprising:
    power converting means including a DC power source and at least one power converter for converting DC power from said DC power source into an AC power output applied to an AC system; and
    security means for stopping operation of said power converter in the event of an abnormal state of said AC system, comprising,
    disturbance generator means for periodically generating a disturbance signal;
    phase detector means for detecting the phase of a voltage or current of said AC system, and providing a phase detection signal based on the detected phase of the voltage or current of said AC system and on said disturbance signal;
    control means for controlling an output of said power converting means in accordance with said phase detection signal, and
    state detector means for detecting whether or not the phase or frequency of the output of said power converting means deviates from a predetermined value, for detecting an abnormal state of said AC system if the phase or frequency of the output of said power converting means deviates from said predetermined value, and for stopping the operation of said control means when said abnormal state is detected;
    wherein said disturbance signal produces deviations in the phase or frequency of the power converting means, said deviations being detected by said state detector means in the event that the phase or frequency of said AC system is in said abnormal state;
    wherein said phase detector of said security means includes:
    a phase locked loop including,
    a comparator for comparing an output of a voltage controlled oscillator with a phase reference which corresponds to the voltage or current phase of said AC system,
    means for generating timing pulses having a frequency corresponding to an output of said comparator and said disturbance signal, and
    signal converter means including said voltage controlled oscillator for converting said timing pulses into said phase detection signal; and
    means for feeding said disturbance signal into said phase locked loop;
    wherein said disturbance signal has the effect of breaking synchronization of said detected phase of the voltage or current of said AC system and the output of said comparator, said phase reference restoring synchronization when the phase or frequency of said phase reference is within predetermined values and said phase reference otherwise not restoring said synchronization such that said phase locked loop is desynchronized when said phase or frequency of said phase reference is outside said predetermined values.

2. A security apparatus according to claim 1, wherein said state detector means includes:
    means for measuring a portion of the period of a voltage or current of said AC system to provide a measured value;
    means for providing a comparison value; and
    means for comparing said measured value with said comparison value, and supplying to said control means a cutoff signal for stopping the operation of said control means based on the result of the comparison between said measured value and said comparison value.

3. A security apparatus according to claim 1, wherein the frequency of said disturbance signal differs from that of a voltage or current of said AC system.

4. A security apparatus according to claim 2, wherein the frequency of said disturbance signal differs from that of a voltage or current of said AC system.

5. A security apparatus according to claim 1, wherein said DC power source includes a solar cell.

6. A security apparatus according to claim 1, wherein said DC power source includes a battery.

7. A security apparatus accordingly to claim 1, comprising:

said power converting means comprising plural power converters each applying AC power to said AC system;

each of said power converters provided with a respective of said security means; and each disturbance generator of each security means generating a disturbance signal which produces a frequency deviation of the respective voltage controlled oscillator in the same direction.

* * * * *